Patented Feb. 11, 1941

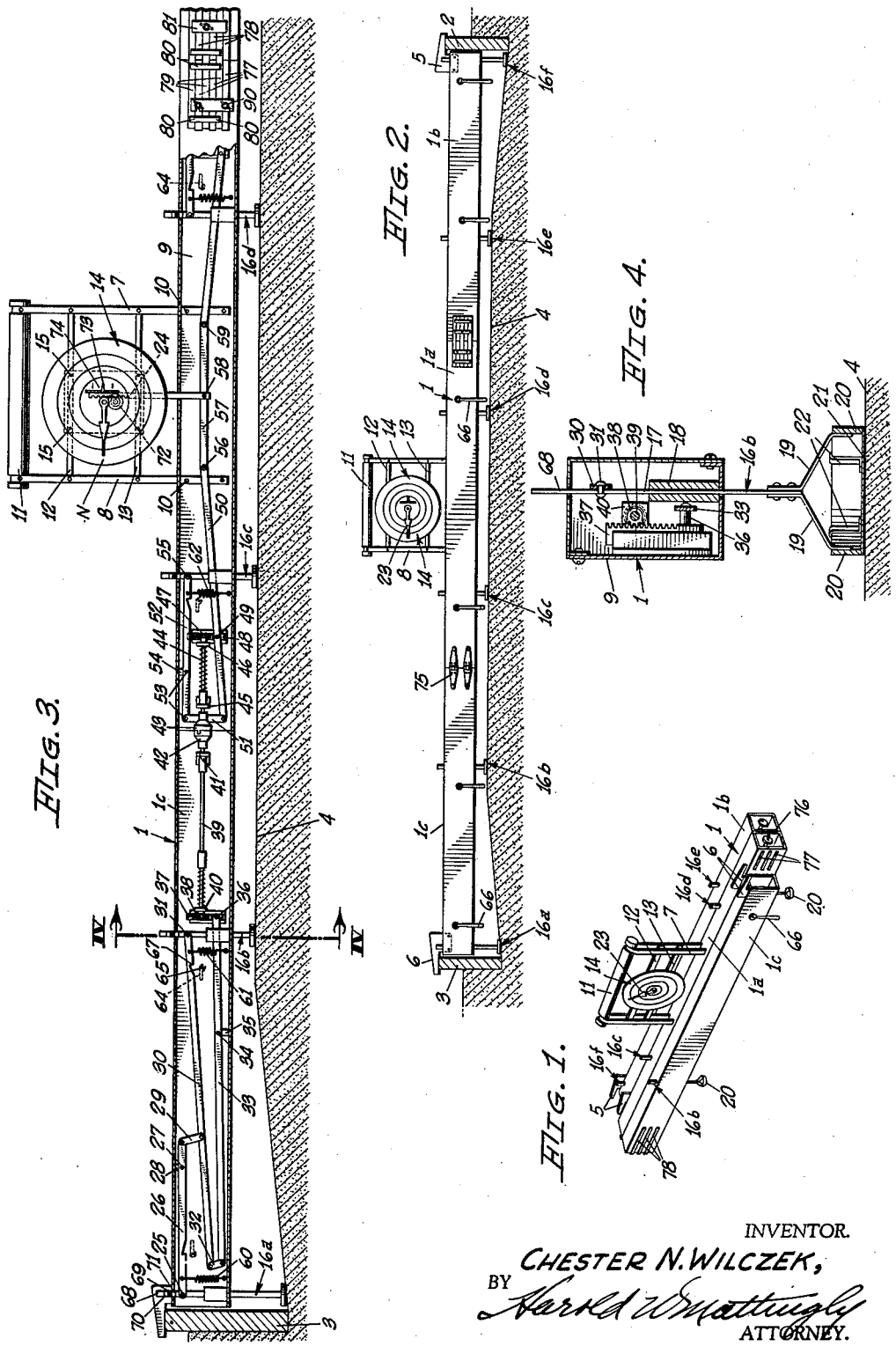

2,231,432

UNITED STATES PATENT OFFICE 2,231,432

VOLUME COMPUTATOR

Chester N. Wilczek, Los Angeles, Calif.

Application July 19, 1938, Serial No. 219,998

10 Claims. (Cl. 33—172)

My invention relates to volume computators and has particular reference to a machine for readily determining the average depth of a graded road bed to compute the volume of concrete required to fill the same.

In the modern practice of highway construction a road bed is prepared by grading the ground surface and erecting along each side thereof headers between which concrete or other road building or road surfacing material will be formed to provide the road surface slab. The specifications to which the contractor works defines the depth of the slab at various points across the highway, so that in preparing the road bed the grading must be such that when a predetermined volume of concrete is poured between the headers it will complete a predetermined length of highway.

As a ready method of determining the compensation for the contractor, it has recently become the practice to measure the volume of concrete used to fill the space between the headers on the basis that if the road bed is properly graded to the specified depth, a predetermined lineal amount of such roadway will require a predetermined volume of concrete.

However, such practice is likely to encourage the contractor to overcut the road bed so that a greater volume of concrete is employed than would be required if the road bed were prepared accurately to specifications. On the other hand it is desirable that the contractor be encouraged to cut or grade the road bed to at least the desired depth in order that the thickness of the road surface slab shall be at least the thickness calculated to be required for the character of traffic expected to pass over the highway, and to encourage such full and complete grading the contractor has been compensated for a small excess volume in the event the grading was slightly different than that required by the specifications.

In order to determine how much compensation is to be paid to the contractor and how much excess volume he is to be paid for, inspectors must measure the depth and lateral contour of the graded road bed at specified intervals along the road under construction and from such measurements calculate the volume of concrete which must be employed to fill that length of road. To make such calculations it has been the practice to arrange a cord across the road bed and across the headers on either side thereof and to measure the distance between such cord and the surface of the graded road bed at a plurality of specific points extending across the graded bed. Such measurements are then calculated to determine the average depth of the lateral cross section of the road bed so that by taking such measurements approximately every twenty feet along the highway the volume of concrete required to fill such twenty feet, span will be readily calculated.

As will be understood however, in order to make such measurements accurately it is necessary for the inspector to carefully adjust his ruler or other measuring device so that it touches the surface of the road bed but does not penetrate below the surface, and it is also necessary that the inspector lean down to determine the measurement accurately in order to avoid errors due to parallax, so that many errors are made by the inspector in taking the measurements. Further, it is necessary for the inspector, after taking the measurements, to return to the field office and there employ the measurements in a mathematical calculation of the average depth of the road bed and to calculate the necessary volume of concrete, each of which calculations provides an opportunity for errors in the completed calculation.

It is therefore an object of my invention to provide a volume computator or measuring device which may be placed across heads of a prepared road bed and which will automatically measure the depth of the graded road bed at a plurality of points spaced laterally across the highway and automatically calculate the average depth of the road bed.

Another object of my invention is to provide a device of the character set forth wherein each of the depth measuring devices may be so connected to an indicator as to produce at the indicator the algebraic sum of the several measurements made thereby.

Another object of my invention is to provide a device of the character set forth in which each of the measuring devices is provided with suitable indicators which will readily note the deviation of the depth of the road bed at that point from the specified limits of variation.

Another object of my invention is to provide a device of the character set forth which is of such light weight and is so compact that it may be readily handled by one man.

Other objects and advantages of my invention will be apparent from a study of the following specifications, read in connection with the accompanying drawing, wherein Fig. 1 is a perspective view of a volume computator embodying my invention in its folded position ready for transport.

Fig. 2 is a side elevational view of my volume computator in its extended position and in a position across the headers of a prepared or graded road bed.

Fig. 3 is an enlarged view of a portion of the computator shown in Figs. 1 and 2 with a portion of the housing removed to show the arrangement of the individual depth measuring members and the manner in which they are coupled to an indicator or calculator.

Fig. 4 is a detail sectional view taken along line IV—IV of Fig. 3.

Referring to the drawing, I have illustrated my volume computating device as comprising a supporting structure 1 adapted to extend between the headers or forms 2 and 3 disposed upon opposite sides of a prepared road bed or sub-grade 4.

In the form of device illustrated herein the supporting structure 1 may comprise an elongated housing containing the levers and other equipment hereinafter described and it may be constructed of relatively light weight sheet metal to facilitate the handling and transporting of the instrument. At each end of the housing 1 I provide a hook like shoe, upon the right hand end of the housing, being designated by the reference character 5, adapted to extend across and rest upon the upper edge of the header 2, while the shoe upon the left hand end of the housing 1 is designated by the reference character 6 adapted to extend across and rest upon the upper edge of the header 3. Thus the housing 1 will be suspended by the headers 2 and 3 with the housing disposed at a predetermined level with respect to the level of the edges of the headers 2 and 3.

Near the center of the housing 1 I provide a dial supporting structure which may include a pair of vertical leg members 7 and 8 rigidly secured to the rear wall 9 of the housing 1 as by means of rivets, bolts or welds indicated at 10. The upper ends of legs 7 and 8 may be interconnected by a handle member 11 by which the instrument may be lifted and carried, while a plurality of cross bars 12 and 13 may extend between the legs 7 and 8 to constitute a support to which an indicating dial 14 and its actuating mechanism may be secured as indicated at 15.

A plurality of measuring devices or "feet" 16a, 16b, 16c, 16d, 16e, and 16f are provided disposed in predetermined spaced relation to each other along the length of the housing 1 and adapted to slide vertically relative to the housing 1 to measure the distance between a predetermined level along the housing 1 and the surface of the road bed or sub-grade 4.

The mechanical construction of each of these feet is substantially identical, and by referring to Fig. 4 it will be noted that each of the feet includes a vertically extending bar 17, preferably having a rectangular cross section slidably mounted in a vertically extending slide bearing 18 secured rigidly to the bottom wall of the housing 1 in such a manner that the bar 17 may freely slide vertically relative to the housing. The lower end of the bar 17 is secured as by means of spider fingers 19 to a ground contacting ring 20. The diameter of the ring 20 may be selected of any suitable value, though I prefer that the same be approximately two inches so that the lower edge of the ring may readily engage the surface of the sub-grade 4 and yet permit small pebbles or lumps of earth to be received within the circle therein between ring 20 and thus prevent the cocking of the ring upon some small irregularity which may be upon the surface of the road bed.

When the device is to be used upon a road bed of relatively hard earth, clay or gravel, the ring will rest lightly upon the surface, although if the road bed is of sand or finely divided material, it may be desired to employ a sand plate illustrated in Fig. 4 as comprising a disc 21 of relatively thin sheet metal having a plurality of spring fingers 22 secured thereto and adapted to snap about the ring 20 to close the space across the interior of the ring and provide an adequate footing, preventing the ring from sinking below the graded surface 4.

It will be observed therefore that when the housing 1 is suspended across the headers 2 and 3 the feet 16a—16f will each fall by gravity until their engaging rings engage and rest upon the surface of the road bed immediately below them, so that the vertical position of each of the feet relative to the housing 1 will represent the depth of the sub-grade at the point of contact with each of the feet.

Since it is the common practice to thicken the roadway, the sub-grade should be deeper at each side than at the central portions thereof so that for any specified contour of sub-grade the respective bars 17 for each of the feet 16a, 16b etc. may be initially selected to conform with the desired depth of the sub-grade at the point to which they should contact the road bed. Thus, if the road bed has been graded properly, at any point across which the instrument is placed, each of the feet 16a, 16b etc. should rest at a predetermined vertical position representing the "normal" or specified contour and depth. Any deviation of the contour from this normal will cause the feet to assume a position higher or lower than this normal, and by determining the algebraic sum of the deviations of the positions of the feet from such normal, the average depth of the sub-grade may be readily computed, and the volume of concrete necessary to construct the pavement may be determined.

The computation of the average depth across the road bed may be readily accomplished by coupling the feet 16a, 16b, etc. to the pointer 23 or indicating device 14 in such a manner that the pointer will rotate about the dial 14 from a normal position indicated at N to some position spaced from this normal, either clockwise or counterclockwise, depending upon whether the average depth is less or greater than the specified normal. This may be readily accomplished by coupling the gear rack 24 which rotates the pointer by a suitable transmission system to each of the feet 16a, 16b, etc. in such a manner that movement of any one of the feet downwardly above its normal position will tend to rotate the pointer in a counterclockwise direction, and any movement of the feet to a position above the normal will tend to move the pointer in a clockwise direction. One form of such transmission is illustrated herein as including a system of levers inter-connecting the gear rack 24 and each of the feet 16a, 16b, etc.

The foot 16a at the left hand end of the housing 1 is illustrated as being coupled at 25 to a lever 26 which is in turn fulcrumed at 27 upon a bracket 28 secured to the housing 1. The right hand end of the lever 26 is coupled by means of a link 29 to a second lever 30, one end of which is coupled as at 31 to the foot 16b while the opposite end of the lever 30 is coupled by means of the link 32 to a third lever 33 fulcrumed at 34 upon a bracket 35 and having its right hand end secured as at 36 to a short gear rack 37.

Meshed with the gear rack 37 is a small pinion 38 secured rigidly upon a shaft 39 rotatably mounted in bearings 40 and 41. At the right hand end of the shaft 39 is a coupling member 42 adapted to engage a complementary coupling member 43 which is in turn mounted upon a short shaft 44 rotatably mounted in bearings 45 and 46. On the right hand end of the shaft 44 is a small pinion 47 meshed with a short gear rack 48, pivoted as indicated at 49 to a lever 50, the left hand end of which is coupled as by means of a link 51 to a lever 52 fulcrumed at 53 upon a bracket 54. The right hand end of the lever 52 is connected as indicated at 55 to the third foot 16c.

The right hand end of the lever 50 is pivoted at 56 to a bar 57 which is in turn pivoted as at 58 to the gear rack 24. The feet 16f, 16e, and 16d are coupled together and to the bar 57 by a system of levers, gear racks, and shafts identical with those described for the feet 16a, 16b, and 16c.

From an inspection of Fig. 3 it will be noted that any up or down movement of any of the feet will be transmitted directly to the gear rack 24 in such a manner that the hand or pointer N will move about its dial to correspond exactly with the variation of the level of the feet. For example, assuming that the subgrade 4 has been cut to the correct depth and has the contour required by the specifications of the job, each of the feet 16a, 16b, etc. will be at their "normal" level, that is, they will be moved to the position shown in Fig. 3 by reason of their contact with the ground surface. Now assuming that the sub-grade has not been cut to the required depth from the center of the sub-grade to a point approximately midway between the feet 16b and 16c, the foot 16c will rest upon the higher level and stand at a position higher than illustrated in Fig. 3.

Assuming also that the sub-grade has been correctly cut from about midway between the feet 16b and 16c to the left hand header 3, the feet 16a and 16b will be at their normal levels. The elevation of foot 16c will raise the right hand end of lever 52 and depress the left hand end thereof. The fulcrum point 53 for lever 52 is selected such that there is a 2:1 ratio between the right and left hand ends of the lever. Depression of the left hand end of the lever will therefore amount to one-half of the elevation of foot 16c, and likewise the lever 50 will have its left hand end depressed by a distance equal to one-half of the elevation of foot 16c. The lever 50 is fulcrumed at 49 upon the gear rack 48 at a point along the lever 50 such that it has a 2:1 ratio between its right and left hand ends and thus (since the feet 16a and 16b are at their normal positions) the right hand end of lever 50 will be elevated by an amount exactly equal to the elevation of foot 16c.

Assuming in the foregoing example that the sub-grade was correctly cut at all points along the right hand side of the road bed, the feet 16d, 16e and 16f will rest at their normal level so that the right hand end of the bar 57 will be located at the level illustrated in Fig. 3. The gear rack 24 is pivotally connected to the bar 57 midway between its ends so that the elevation of the right hand end of lever 50 will raise the bar 57 about its now stationary right hand end 59 and the pointer will move in a clockwise direction through a distance upon its dial 14 corresponding to the elevation of the foot 16c. The pivoting of the gear rack 24 at the mid point of lever 57 will therefore cause the pointer to indicate the average amount of difference between the normal or specified level of the road bed and the excess elevation assumed to have existed in the road bed. By calibrating the dial 14 in terms of volume of concrete required to fill a twenty foot stretch of the sub-grade 4 at the specified level it follows that the shifting of the pointer in a clockwise direction will permit the direct reading of the diminished volume required to fill this portion of the road bed which has been left too high.

Assuming now that the portion of the road bed 4 was too high in the section between the center line of the roadway and some point between the feet 16b and 16c, but is cut too low at some section below the foot 16b and is at the correct depth beneath the foot 16a. The foot 16a will therefore be at the "normal" level and its lever 26 will be at the position shown in Fig. 3. The foot 16b, however, will be at a lower level, lowering the right hand end of the lever 30. The lever 30 in this instance will fulcrum around its pivotal connection with the link 29 (held at the normal level by the foot 16a). Thus the left hand end of lever 30 will be elevated, raising the left hand end of lever 33 and lowering the right hand end of lever 33. The selection of the lengths of the arms of lever 30 on opposite sides of its fulcrum 29 and selection of the lengths of the arms of lever 33 on each side of its fulcrum 34 may be made such that the right hand end of lever 33 will move through a distance exactly corresponding to the amount of movement of the foot 16b (that is, the leverage is such that there is a 3:1 ratio of movement between the foot 16b and the gear rack 37).

The gear rack 37 will now be in a position below "normal" and will have rotated shaft 39 a distance corresponding to such deviation from the normal level. By reason of the coupling 42—43 the pinion 47 will also have been rotated through a distance such that the gear rack 48 has been lowered by an amount exactly corresponding to the displacement of the foot 16b below its normal level and will lower the level 50.

It will be remembered that the foot 16c at this time was at a level higher than normal so that the lever 50 has been moved about its fulcrum point 49 a distance corresponding to the elevation of the foot 16c. However, the fulcrum point 49 of lever 50 has been moved downwardly by reason of the downward displacement of the foot 16b. By reason of the selection of the lengths of the lever 50 on each side of its fulcrum point 49, the elevation of the foot 16c has been compensated for by the lowering of the foot 16b, the total amount of movement of the point 56 of the bar 57 representing the algebraic sum of the displacement of the two feet 16b and 16c from their "normal" positions.

Thus the gear rack 24 will be shifted by such an amount as will represent this algebraic sum. If the amount of undercutting of the road bed at 16c equals the amount of overcutting at 16b, the average level of the road bed or sub-grade 4 will be normal and the pointer 23 will remain at its normal calibration, denoting the fact that the normal quantity of concrete will be required to fill the road bed.

As it will be noted from the foregoing explanation, the amount of shifting of the gear rack 24 from its normal position, by reason of elevation or lowering of the feet 16b or 16c, will represent one-half of the shifting of either of the feet 16b or 16c so that the amount of movement of the pointer will represent the average difference in the level of the road bed.

In the foregoing examples it has been considered that the deviation from the normal has been entirely on the left hand side of the center line of the sub-grade. Since the system of leverage is duplicated on the right hand side of the instrument, any deviation of the level of the sub-grade will be detected by the feet on that end of the instrument and the amount thereof will be transmitted to the right hand end of the bar 57, raising or lowering that end of the bar by an amount equal to the algebraic sum of the under or over cutting of that side of the sub-grade. The arms of the bar 57 on opposite sides of the gear rack 24 being equal to each other, the total movement of the gear rack 24 will represent the algebraic sum of the differences from the normal level on the right hand side of the center line and the differences on the left hand side of the center line.

As hereinbefore described, the sub-grade is usually cut to a lower depth immediately adjacent the headers or forms 2 and 3. The end feet 16a and 16f should engage the surface of the sub-grade immediately adjacent the headers so that to detect differences in the average level of the sub-grade between the point of contact of the foot 16a and the next foot 16b, the leverage system 26, 29 and 33 which transmits the deviation from the correct or specified level should be such as to produce only a 1:2 movement of the right hand end of the lever 50 (as distinguished from the 1:1 ratio produced by the feet 16b and 16c) so that the shifting of the foot 16a will be measured in terms of average deviation from the specified level. For this reason the lever 26 is so fulcrumed that motion of the foot 16a will operate the lever 30 by a ratio such that when the motion of the lever 26 is transmitted through levers 30, 33, gear rack 37, shaft 39, gear rack 48 and lever 50 to the left hand end of the bar 56, this end of the bar 56 will be moved upwardly or downwardly in a 1:2 ratio with respect to the movement of the foot 16a, that is, any shifting of position of the foot 16a a given distance will move the left hand end of lever 57 through only one-half of such distance. An identical leverage system is employed to connect with the right hand foot 16f.

It follows therefore that each of the feet contacting the sub-grade surface measures the average level between its point of contact and the point of contact of the adjacent foot and transmits this measurement directly to the pointer 23 and dial 14, avoiding the necessity of making six separate measurements at the points of contact, noting them in a book and then computing the algebraic sum by mathematics and then computing the volume of concrete necessary to fill a twenty foot strip of road bed cut to the average level so determined. Instead, the system of levers and the dial and pointer automatically computes the volume without the possibility of error.

To overcome possible friction between the bars 17 and their guides 18, I prefer to provide relatively weak springs normally urging each of the feet downwardly from the housing, such spring being indicated at 60, 61, 62 and 63 associated with the feet 16a, 16b, 16c and 16d respectively.

In order to check the accuracy of the instrument from time to time, I provide means for manually moving each of the feet to the correct level with respect to the housing 1 representing the position such feet would assume upon the road bed graded to the desired specifications so that when such means is used, the pointer 23 should rest upon the normal calibration N of the dial 14. Such shifting means is illustrated herein as comprising a cam 64 for each of the feet 16a, 16b etc. mounted upon a short shaft 65 provided with a handle 66 outside of the housing 1. The length of the cam 64 is such that when the handles 66 are rotated through 90 degrees the cam 64 will engage the lever associated with the respective feet and elevate the same to the "normal" level. If desired, a notch 67 may be cut in each of the levers to stop the cams in a definite position relative to the levers they engage. If it is found, upon such check of the instrument, that the point does not coincide with the normal calibration, the dial and pointer mechanism may be shifted upwardly or downwardly upon the supporting structures 7, 8, 12 and 13 to make the required adjustment.

In order to permit the inspector to readily detect serious deviations in the sub-grade from the specified levels, each of the feet may constitute a visual indicator showing that the sub-grade is at the specified depth or within permissible limits of error, or is undercut or overcut beyond the permissible error limits. This may be readily accomplished by extending the vertical bar 17 of the feet upwardly through the upper wall of the housing 1 as indicated at 68, and by painting bands or stripes of different colors thereon. Thus, if the road bed is within the permissible limits of error, the middle band 69 and the upper band 70 will be visible above the top of the housing 1. If the grade has been overcut the middle band 69 will not be visible and the inspector will know immediately that the grade has been overcut beyond the permissible limits. On the other hand, if the sub-grade has been undercut the lower band 71 will be visible above the housing 1 and the inspector will know immediately that there is an unpermissible deviation from the specifications.

While the calibration of the dial 14 may be arbitrarily selected, I prefer, in the interest of the accuracy of the instrument, to have the pointer end move through a considerable arc for each unit of deviation of the sub-grade from the desired normal and, in such instance, suitable gearing 72 may be interposed between the gear rack 24 and the pointer 23 to increase the amount of movement of the pointer 23 for a given increment of movement of the gear rack 24. In the illustration shown in Fig. 3 there is a 3:1 ratio provided so that the dial 14 may be divided into three concentric sections, each of which represents one rotation of the pointer 23. Such sets of calibrations on the surface of the dial on which they are rotating may be readily calculated, and in order to determine which of the sets of calibrations to read, the gear rack 24 may be provided with a finger 73 which goes across vertically disposed calibrations or painted bands 74, indicating whether the dial has been rotated in either direction less than one revolution or more than one revolution.

While the housing 1 may be constructed as a single rigid unit extending across the entire width of the sub-grade, I prefer, for convenience in handling and transporting the instrument, to divide the housing into a plurality of parts, hinging them together in such a manner that they may be folded as indicated in Fig. 1. As illustrated in Fig. 1, the housing may be divided into three sections, a central section 1a, a right hand end section 1b and a left hand end section 1c. The sections 1a and 1c are hinged together as indicated at 75 in Fig. 3 as by providing one or more strip hinges extending across the gap between the housing sections 1a and 1c. Similarly, the sections 1a and 1b may be hinged together as indicated at 76.

In order to hold the entire housing rigid when it is in its extended position, I provide a locking or bracing structure which may comprise a plurality of short strips of steel or similar material 77, welded or otherwise secured to the housing section 1a and a series of short strips 78 secured to the housing section 1b each of the said strips 77 and 78 being disposed on opposite sides of the gap between the adjacent housing sections. A locking structure may be constructed as a grid comprising elongated strips of steel 79 held together by cross strips 80 in such a manner that they may be inserted in the spaces between the arranged strips 77 and 78 and held in place thereon by means of clamps 81 removably secured as by means of thumb screws 90 at their associated housing sections.

When the housing 1 is divided into foldable sections the shafts 39 and 44 with their coupling members 42 and 43 permit the ready operation of the leverage system on opposite sides of the gap between the housing sections but provides a coupling system which can interengage in only one position when the housing sections are unfolded or extended.

It will therefore be seen that I have provided a volume measuring and computing apparatus which may be readily handled and readily transported from place to place upon a particular job or from job to job, and when in use automatically computes the average depth of the graded road bed merely by placing the instrument across the headers or forms on opposite sides of the road bed. In addition to computing the average depth (and also the required volume of concrete to fill the road section) the instrument acts as an indicator or warning device, detecting any unpermissible deviations of the sub-grade level from the desired specifications.

It will be understood by those skilled in the art that the system of levers, gear racks and pinions illustrated herein represents but one form of transmission system which may be employed to interconnect the feet with the indicating dial and I do not desire to be limited to any of the details illustrated and described herein, especially as defined in the appended claims.

I claim:

1. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, indicating means including a movable member, and means coupling each of said feet to said movable member to move the same through a distance representative of one-half the algebraic sum of the products of the distance between the level of each of said feet and said predetermined level by the sum of the distances between each of said feet and the next adjacent feet.

2. In a pavement volume computator, a support adapted to extend across a prepared road bed, means associated with said support for suspending said support at a predetermined level above the surface of said road bed, a plurality of road bed surface engaging feet carried by said support in uniform spaced relation to each other including a pair of end feet disposed at opposite ends of said support and a plurality of intermediate feet disposed between said end feet, means mounting said feet upon said support for vertical movement toward and away from said level, indicating means including a movable member, and means coupling each of said feet to said movable member to move the same through a distance representative of one-half the algebraic sum of the distances between the level of said end feet and said predetermined level, plus the algebraic sum of the distances between said intermediate feet and said predetermined level.

3. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, indicating means including a movable member, and means intercoupling each of said feet with each other and with said movable member to move the same through a distance representative of one-half the algebraic sum of the products of the distance between the level of each of said feet and said predetermined level by the sum of the distances between each of said feet and the next adjacent feet.

4. In a pavement volume computator, a support adapted to extend across a prepared road bed, means associated with said support for suspending said support at a predetermined level above the surface of said road bed, a plurality of road bed surface engaging feet carried by said support in uniform spaced relation to each other including a pair of end feet disposed at opposite ends of said support and a plurality of intermediate feet disposed between said end feet, means mounting said feet upon said support for vertical movement toward and away from said level, indicating means including a movable member, means intercoupling each of said feet with each other and with said movable member to move the same through a distance representative of one-half the algebraic sum of the distances between the level of said end feet and said specified level, plus the algebraic sum of the distances between said intermediate feet and said specified level.

5. In a pavement volume computator, a support adapted to extend across a prepared road bed, means associated with said support for suspending said support at a predetermined level above the surface of said road bed, a plurality of road bed surface engaging feet carried by said support in uniform spaced relation to each other including a pair of end feet disposed at opposite ends of said support and a plurality of intermediate feet disposed between said end feet, means mounting said feet upon said support for vertical movement toward and away from said level, indicating means including a movable member, lever means intercoupling each of said feet and said movable member to move said member to a position representative of one-half the algebraic sum of the distances between the level of said end feet and said predetermined level, plus the algebraic sum of the distances between said intermediate feet and said predetermined level.

6. In a pavement volume computator, a support adapted to extend across a prepared road bed, means associated with said support for suspending said support at a predetermined level above the surface of said road bed, a plurality of road bed surface engaging feet carried by said support in uniform spaced relation relative to each other including at least one end foot disposed to engage the road bed adjacent the side edge thereof, means mounting said feet upon said support for movement toward and away from said level, indicating means on said support including a movable member, means interconnecting said end feet to said movable member to move the same through a distance representative of one-fourth of the distance of movement of said end feet toward and away from said predetermined level, and means intercoupling the remaining feet with said movable member to move the same through a distance representative of one-half of the net distances of movement of all of said remaining feet toward and away from said predetermined level.

7. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, indicating means including a movable member, means coupling each of said feet to said movable member to move the same through a distance representative of one-half the algebraic sum of the products of the distance between the level of each of said feet and said predetermined level by the sum of the distances between each of said feet and the next adjacent feet, said support being divided into a plurality of relatively foldable sections, means interconnecting said sections for folding movement relative to each other, and means for automatically interconnecting said feet coupling means when said sections are in their extended positions.

8. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, and means coupled to said feet for automatically indicating one-half the algebraic sum of the products of the distance between the level of each of said feet and said predetermined level by the sum of the distances between each of said feet and the next adjacent feet, each of said feet including a ring adapted to present a relatively small contact area to the surface of said road bed.

9. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, means coupled to said feet for automatically indicating one-half the algebraic sum of the products of the distance between the level of each of said feet and said predetermined level by the sum of the distances between each of said feet and the next adjacent feet, each of said feet including a ring adapted to present a relatively small contact area to the surface of said road bed, and a sand plate including means for removably connecting the sand plate across the lower surface of said ring to increase the surface area contact between said feet and said road bed surface.

10. In a pavement volume computator, a support adapted to extend across a prepared road bed, means associated with said support for suspending said support at a predetermined level above the surface of said road bed, a plurality of road bed surface engaging feet carried by said support in spaced relation to each other, means mounting said feet upon said support for vertical movement toward and away from said level, indicating means including a movable member, means coupling each of said feet to said movable member to move the same through a distance representative of one-half the algebraic sum of the products of the distance between the level of each of said feet and said predetermined level by the sum of the distances between each of said feet and the next adjacent feet, and manually operable means carried by said support and engageable with said coupling means for moving each of said feet to a predetermined position relative to said level to insure the accuracy of said indicating means.

CHESTER N. WILCZEK.